(12) United States Patent
Olsson et al.

(10) Patent No.: US 8,762,977 B2
(45) Date of Patent: Jun. 24, 2014

(54) MOBILE DEVICE SOFTWARE MANAGEMENT METHOD AND APPARATUS

(75) Inventors: Magnus Olsson, Teckomatorp (SE); Björn Bjäre, Lund (SE); Annika Brobach, Malmö (SE); Chi Thu Le, Lund (SE); Louis Verhaard, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1543 days.

(21) Appl. No.: 12/100,648

(22) Filed: Apr. 10, 2008

(65) Prior Publication Data

US 2009/0259990 A1    Oct. 15, 2009

(51) Int. Cl.
    *G06F 9/44* (2006.01)
(52) U.S. Cl.
    USPC .......................................... 717/168; 717/120
(58) Field of Classification Search
    USPC ........................................................ 717/174
    See application file for complete search history.

(56) References Cited

U.S. PATENT DOCUMENTS

| | | | |
|---|---|---|---|
| 6,167,564 A | 12/2000 | Fontana et al. | |
| 6,311,321 B1 | 10/2001 | Agnihotri et al. | |
| 7,698,684 B2 * | 4/2010 | Baikov | 717/118 |
| 7,941,784 B2 * | 5/2011 | Shenfield et al. | 717/107 |
| 7,941,810 B2 * | 5/2011 | Khanna et al. | 719/318 |
| 2003/0217193 A1 | 11/2003 | Thurston et al. | |
| 2004/0031030 A1 | 2/2004 | Kidder et al. | |
| 2004/0093593 A1 | 5/2004 | Jhanwar et al. | |
| 2004/0117785 A1 * | 6/2004 | Kincaid | 717/170 |
| 2004/0177352 A1 | 9/2004 | Narayanaswamy et al. | |
| 2004/0255291 A1 * | 12/2004 | Sierer et al. | 717/174 |
| 2005/0097574 A1 | 5/2005 | Morrison et al. | |
| 2005/0132358 A1 * | 6/2005 | Peev et al. | 717/174 |
| 2005/0257093 A1 | 11/2005 | Johnson et al. | |

(Continued)

FOREIGN PATENT DOCUMENTS

| | | |
|---|---|---|
| WO | 03/083688 A1 | 10/2003 |
| WO | 2006/089387 | 8/2006 |
| WO | 2007/046977 | 4/2007 |

OTHER PUBLICATIONS

Birsan, Dorian. "On Plug-ins and Extensible Architectures." Queue, Mar. 2005, pp. 40-46.

(Continued)

*Primary Examiner* — Wei Zhen
*Assistant Examiner* — Matthew Brophy
(74) *Attorney, Agent, or Firm* — Coats & Bennett, P.L.L.C.

(57) ABSTRACT

Mobile device software is managed by providing an interface between a plurality of software module handlers and a plurality of software modules. The interface is invoked responsive to a software module event such as the installation, removal, activation or modification of a software module. The interface identifies the software module and a corresponding attribute list associated with the software module event. The attribute list specifies one or more actions to be taken by at least one of the software module handlers that enable the identified software module to provide one or more functions when invoked. The attribute list is provided to each software module handler identified in the list and each action specified in the list is taken by the corresponding software module handler. This way, the interface reliably manages the different software modules without being aware of the particular functions provided by the modules or the specific actions taken by the handlers.

19 Claims, 5 Drawing Sheets

(56) References Cited

U.S. PATENT DOCUMENTS

| | | | |
|---|---|---|---|
| 2006/0026590 | A1 | 2/2006 | Berenberg et al. |
| 2006/0206890 | A1 | 9/2006 | Shenfield et al. |
| 2006/0236325 | A1 | 10/2006 | Rao et al. |
| 2007/0044023 | A1 | 2/2007 | Carter et al. |
| 2007/0083512 | A1 | 4/2007 | Pepin et al. |
| 2007/0201654 | A1 | 8/2007 | Shenfield |
| 2007/0201655 | A1 | 8/2007 | Shenfield |
| 2008/0141241 | A1* | 6/2008 | Mills .............................. 717/174 |
| 2008/0196024 | A1* | 8/2008 | Barfield et al. ............... 717/177 |

OTHER PUBLICATIONS

Blewitt, Alex. "Getting Started with Eclipse Plug-ins: Creating Extension Points." Available at: http://www.eclipsezone.com/eclipse/forums/t97608.rhtml.

Blewitt, Alex "Getting Started with Eclipse Plug-ins: Understanding Extension Points." Available at: http://www.eclipsezone.com/eclipse/forums/t93753.html.

Bolour, Azad. "Notes on the Eclipse Plug-in Architecture." Eclipse Corner Article, Copyright 2003 Bolour Computing. Available at: http://www.eclipse.org/articles/Article-Plug-in-architecture/plugin_architecture.html.

Dearle, Alan. "Software Deployment, Past, Present and Future." Future of Software Engineering, 2007 (FOSE '07), May 23-25, 2007, pp. 269-284. ISBN: 0-7695-2829-5.

Lubell, Joshua. "An XML Repository Architecture for Step Modules." Available at: http://www.mel.nist.gov/msidlibrary/doc/xmlrepo.pdf.

Melhem, Wassim et al. "PDE Does Plug-ins." Eclipse Corner Article, Copyright 2003 International Business Machines Corporation. Available at: http://www.eclipse.org/articles/Article-PDE-does-plugins/PDE-intro.html.

Morris, Ben. "Symbian OS Architecture Overview—Wireless Developer Forum UK '06." Available at: http://developer.symbian.com/wiki/download/attachments/1376/Ben_Morris.ppt?version=1.

Nistor, Eugen C. et al. "ArchEvol: Versioning Architectural-Implementation Relationships." Proceedings of the 12th International Workshop on Software Configuration Management, 2005, pp. 99-111. ISBN: 1-59593-310-7.

Parrish, Allen et al. "Binary Software Components in the Undergraduate Computer Science Curriculum." Proceedings of the 32nd SIGCSE Technical Symposium on Computer Science Education, 2001, pp. 332-336. ISSN: 0097-8418.

Payton, J. et al. "Using XML for an Architecture Interaction Conspectus." Available at: http://pizza.cs.ucl.ac.uk/xse01/ready/19.pdf.

Stuckenholz, Alexander et al. "Safe Component Updates." Proceedings of the 5th International Conference on Generative Programming and Component Engineering, 2006, pp. 39-48. ISBN: 1-59593-237-2.

Van Der Storm, Tijs. "Continuous Release and Upgrade of Component-Based Software." Proceedings of the 12th International Workshop on Software Configuration Management, 2005, pp. 43-57. ISBN: 1-59593-310-7.

"Plug-in Manifest File Reference." Available at: http://www.xfy.com/manual/dev/developer/1.5/spec/reference_manifest.html/.

Author Unknown. "Software Component Management Object." Draft Version 1.0—May 3, 2007. Open Mobile Alliance (OMA-TS-DM-SCOMO-V1_20070503-D).

* cited by examiner

```xml
<?xml version="1.0" encoding="UTF-8"?>
<bsu id="se.ericsson.mydpu" type="dpu" version="1.3.12" provider_name="EMP">
  <parts>
    <load_module name="cxc000000_U250_LOADMODULE_nor.elf" type="ELF"/>
    <resource name="song.mp3" path="/afs/music"/>
    <resource name="song2.mp3" path="/afs/music"/>
  </parts>
  <provides>
    <suite version="2.0" vendor="EMP" name="SampleSuite">
      <application singleton="no" stack_size="1024"
        guid="81CFDA44-E4E1-4186-9F47-2124C0089790" name="ClientApplication"/>
      <application singleton="no" stack_size="1024"
        guid="7386969c-3c83-470c-8ee2-bab680edde63" name="ClockApplication"/>
    </suite>
  </provides>
  <requires>
    <required_components>
      <cid guid="65551674-EE76-4494-8502-8A8D0C14E555"/>
      <cid guid="A086969c-3c83-470c-8ee2-bab680edde63"/>
      <cid guid="88551674-EE76-4494-2124C0089790"/>
    </required_components>
  </requires>
</bsu>
```

*FIG. 5*

MOBILE DEVICE SOFTWARE MANAGEMENT METHOD AND APPARATUS

BACKGROUND

The present invention generally relates to mobile device software, and particularly relates to managing mobile device software.

Mobile device software is conventionally treated as a monolithic entity. Treating mobile device software as such often results in long build times and a large number of build variants because all components of the software are typically linked together at build time. Thus, the entire software package must be re-linked each time a component is added, deleted or otherwise modified. It also takes longer to sign the software because the entire software package is typically signed each time a modification is made. More mobile device resources are also needed to download and install a conventional software package because the mobile device must process the entire monolithic software package each time a change is made to the software.

One conventional approach for reducing the amount of code loaded in order to update mobile device software involves identifying the difference between the current version of the monolithic software package and the new version of the software. Only code corresponding to the difference is downloaded and installed on the mobile device. This approach has been used for FOTA (Firmware Over The Air) upgrades where bandwidth is limited. However, mobile devices tend to be highly configurable. This trend continues to increase as mobile devices become more feature-rich. Many mobile devices now offer the ability to uniquely configure the device setup and many aspects of operation. As such, managing mobile device software is becoming highly end-user specific. This places an inordinate burden on FOTA servers to manage numerous end-user specific mobile device configurations.

Software modularization, where the monolithic package is divided into smaller components that are managed separately, has yet to be widely adopted for the mobile device environment. The OMA Software Component Management Object standardization body is addressing how mobile device software is installed and executed as a group of separately managed components. However, compatibility between heterogeneous software components has yet to be addressed. Incompatible software components can degrade mobile device performance and result in error prone operation. For example, software installed by the mobile device platform provider is typically managed in a different framework than software provided by other sources such as a third-party vendor or a customer of the platform provider. This results in an inconsistent software environment where code and data are not optimally managed. Inefficient or error-prone device operation can result unless interdependencies between dissimilar software components are properly resolved at run-time or install-time. Conventional mobile device software modularization techniques are highly tailored and limited, making it difficult to properly manage different types of mobile device software.

SUMMARY

According to the methods and apparatus taught herein, heterogeneous software modules provided by different sources are managed within the same modularized or componentized framework. Mobile device software is segmented into separately manageable modules. Additions, deletions or other changes to the mobile device software can be made by modifying the corresponding module(s) and not the entire software package. Software module handlers manage the software modules to ensure consistent and reliable mobile device operation. In response to a software event such as the installation, removal, activation or modification of a software module, the software module handlers take one or more actions. These actions are related to the event that occurred and the module(s) involved. The actions taken by the software module handlers enable the modules to provide the function for which they are designed when subsequently invoked. For example, the handlers can perform compatibility checks, properly setup the run-time environment, deploy software module components to their proper location, etc. Thus, the module handlers ensure that the software modules properly interact with each other when installed on a mobile device.

In one embodiment, mobile device software is managed by providing an interface between a plurality of software module handlers and a plurality of software modules. The interface is invoked responsive to a software module event such as the installation, removal, activation or modification of a software module. The interface is used to identify the software module and a corresponding attribute list associated with the software module event. The attribute list specifies one or more actions to be taken by at least one of the software module handlers that enable the identified software module to provide one or more functions when invoked. The attribute list is provided to each software module handler identified in the list and each action specified in the list is taken by the corresponding software module handler. This way, the interface reliably manages the different software modules without having to be aware of the particular functions provided by the modules or the specific actions taken by the handlers. The interface provides a high-level software management mechanism that ensures mobile device software compatibility and interoperability by directing software module events to the appropriate handler(s) for processing.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIG. 5 illustrates an embodiment of a file parsed by a mobile device software module manager.

DETAILED DESCRIPTION

Figure 1:
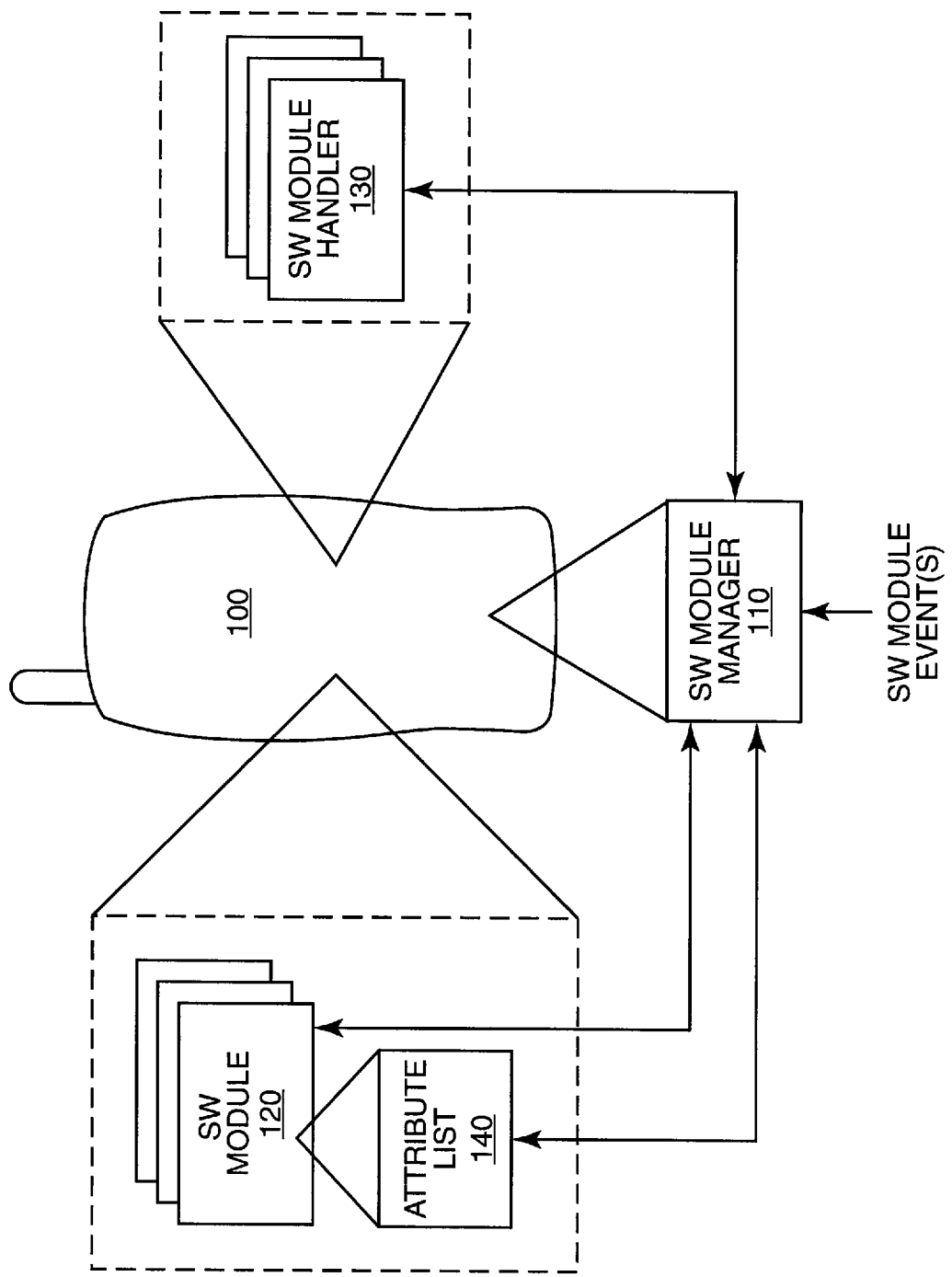
FIG. 1 is a block diagram of an embodiment of a mobile device including a software module manager.

FIG. 1 illustrates an embodiment of a mobile device 100 such as a mobile phone, portable computing device, handheld electronic device, etc. The mobile device 100 includes a software (SW) module manager 110 which may be implemented in software, hardware or some combination thereof. The SW module manager 110 serves as an interface between a plurality of heterogeneous mobile device software (SW) modules 120 and a plurality of software (SW) module handlers 130. Software applications installed on the mobile device 100 utilize one or more of the SW modules 120. The SW modules 120 may be designed by different entities such as the mobile device platform provider, a third-party vendor or a customer of the platform provider. Thus, the SW modules 120 can have dissimilar components such as code, data, files or any other type of information or resource that supports one or more mobile device applications.

Each SW module 120 enables one or more mobile device functions when invoked. The SW module handlers 130 take different actions when invoked by the SW module manager 110. The SW module handlers 130 can also be implemented in software, hardware or some combination thereof. The actions taken by the SW module handlers 130 ensure that the SW modules 120 are properly installed on the device 100 and interoperable with each other. This way, when one or more of the SW modules 120 are subsequently invoked to support a mobile device application, the modules 120 do not adversely affect mobile device operation or cause erroneous operation.

Figure 2:
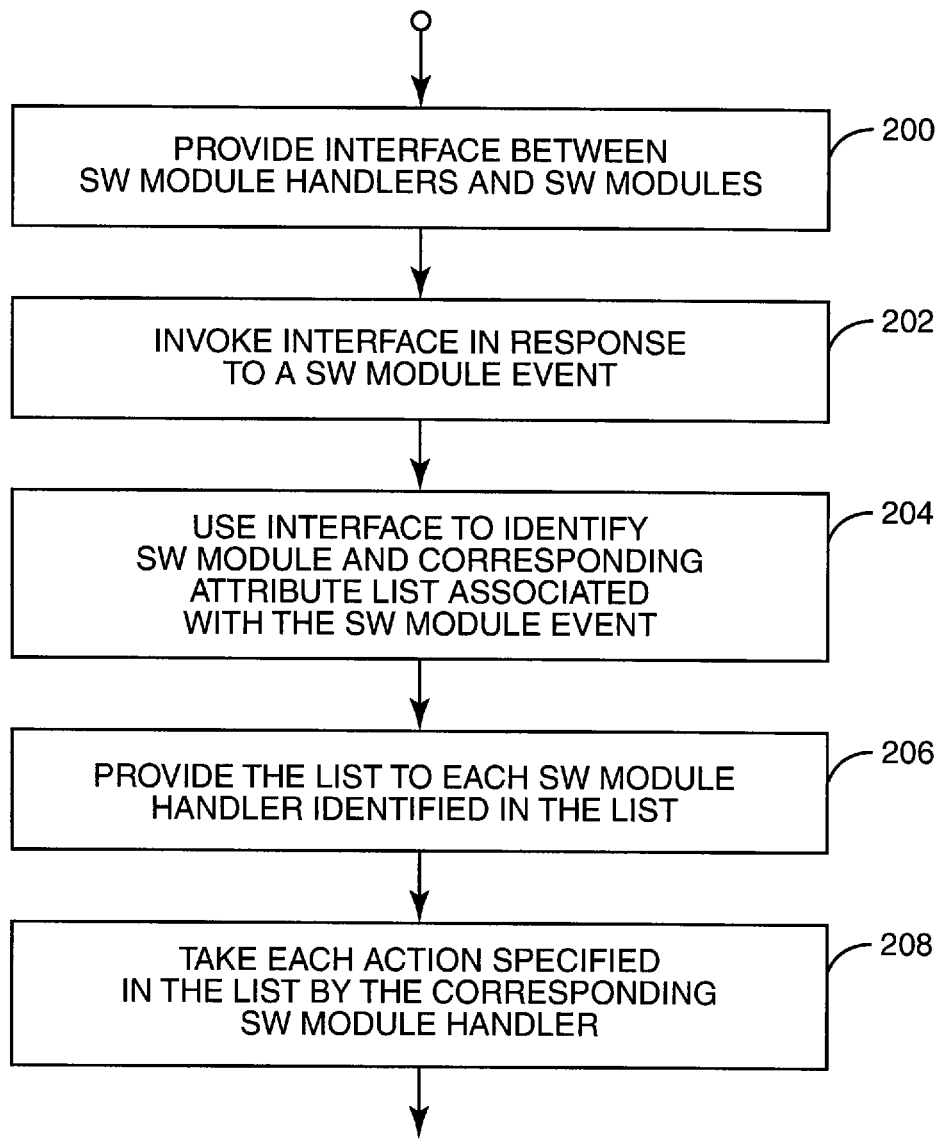
FIG. 2 is a logic flow diagram of an embodiment of processing logic for managing mobile device software.

The SW module manager 110 provides an interface for reliably managing the different SW modules 120 without having to be aware of the particular functions provided by the modules 120 or the specific actions taken by the SW module handlers 130, e.g., as illustrated by Step 200 of FIG. 2. The SW module manager 110 ensures mobile device software compatibility and interoperability at a high-level by activating the appropriate SW module handler(s) 130 to service software module events when they arise. Software module events may include actions such as an FOTA event, software application management event, SW module management event, or the like. Broadly, each software module event involves the installation, removal, activation or modification of one or more of the SW modules 120, e.g., as illustrated by Step 202 of FIG. 2. The SW module manager 110 identifies the SW module 120 and a corresponding attribute list 140 associated with the software module event, e.g., as illustrated by Step 204 of FIG. 2. The list 140 specifies one or more actions to be taken by at least one of SW module handlers 130. The action(s) to be taken by the identified SW module handlers 130 enable the corresponding SW module 120 to provide one or more functions when subsequently invoked. The list 140 is provided to each SW module handler 130 identified in the list 140, e.g., as illustrated by Step 206 of FIG. 2. Each action specified in the list 140 is taken by the corresponding SW module handler 130, e.g., as illustrated by Step 208 of FIG. 2. According to one embodiment, the SW module handlers 130 are locally invoked by the SW module manager 110 included in the device 100. In another embodiment, the SW module handlers 130 are remotely invoked before a SW module 120 is transferred to the mobile device 100.

Figure 3:
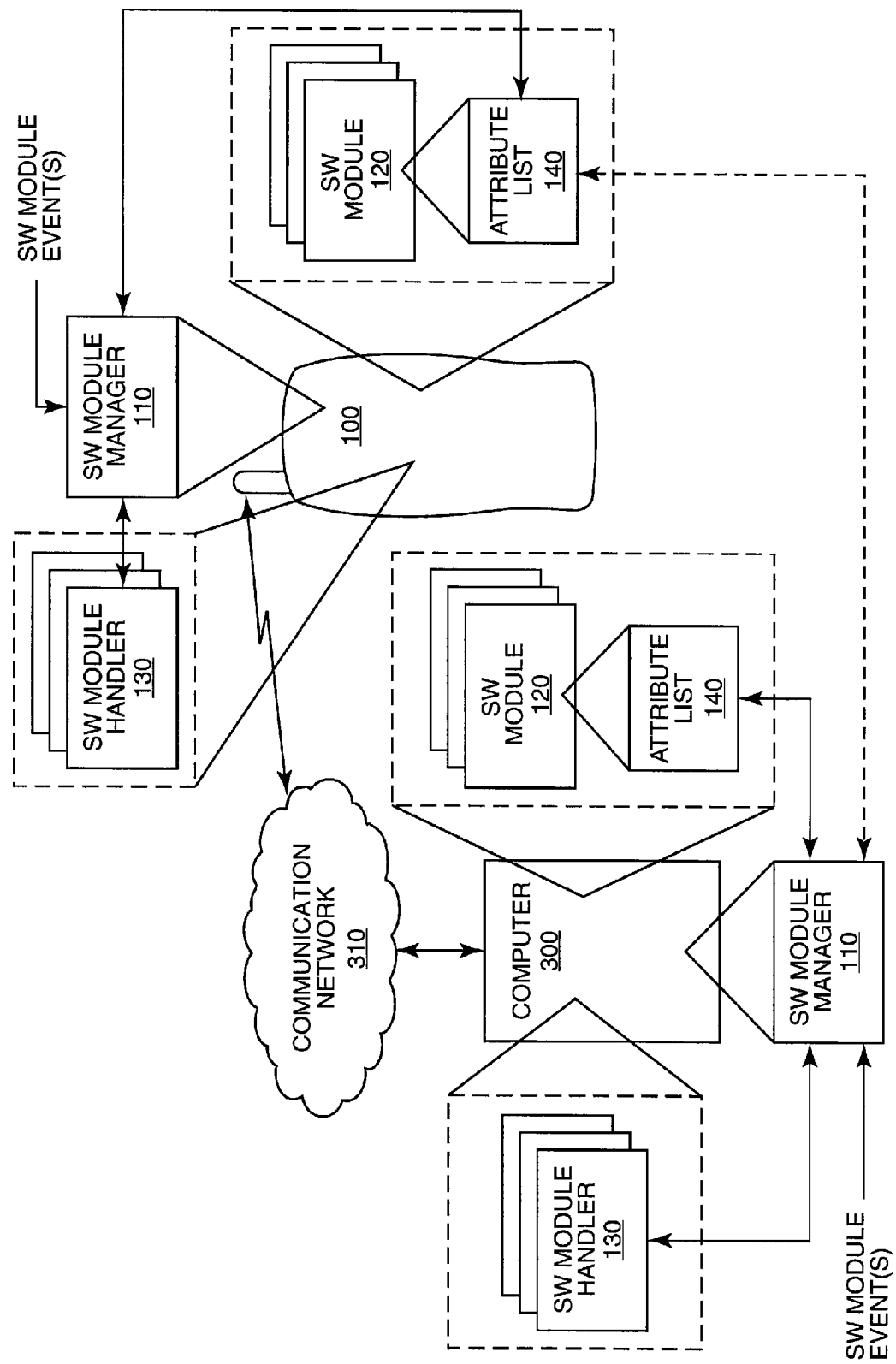
FIG. 3 is a block diagram of an embodiment of a remote computer system including a mobile device software module manager.

FIG. 3 illustrates an embodiment of a computer system 300 such as a personal computer, portable computer, server or the like that includes the SW module manager 110 and at least some of the SW module handlers 130. The SW module manager 110 and handlers 130 can be remotely located from the mobile device 100. Such an arrangement may be employed by the mobile device manufacturer, service provider or other remote entity that has access to the mobile device 100. This way, the SW modules 120 can be verified before being transferred to the mobile device 100. This reduces the processing demand placed on the mobile device 100. It also enables the remote entity to test the SW modules 120 before deployment. The mobile device 100 may also include the SW module manager 110 and handlers 130 for providing an additional layer of mobile device software management. The SW module manager 110 included in the mobile device 100 responds to software module events directed to the mobile device 100 and provides a description of the current device setup to the SW module manager 110 residing on the remote computer 300. Including the SW module manager 110 and handlers 130 in both the computer 300 and mobile device 100 ensures software transferred to the device 100 from sources other than the computer system 300 (e.g., from a memory card or other source) is properly managed and maintained. Doing so also provides an additional layer of SW compatibility verification.

The computer system 300 accesses the mobile device 100 via a wireless or wired communication network 310. The SW module manager 110 provides an interface between the SW module handlers 130 maintained by the computer 300 and the mobile device SW modules 120. Some of the SW modules 120 may already be loaded on the device 100 while others may not yet be installed. Either way, the SW module manager 110 recognizes a software module event and identifies the SW module 120 and corresponding attribute list 140 associated with the event. The SW module manager 110 obtains the list 140 from the mobile device 100 over the communication network 310 when the SW module 120 of interest is already loaded on the device 100. Otherwise, the list 140 is locally retrieved by the computer 300. Either way, the list 140 specifies action(s) to be taken by one or more of the SW module handlers 130 locally maintained by the computer 300. The SW module manager 110 provides the list 140 to each SW module handler 130 identified in the list 140 so that the specified actions can be taken by the corresponding SW module handlers 130. SW module handlers 130 can be added, deleted or otherwise changed, modifying how the SW modules 120 are managed and maintained.

Figure 4:
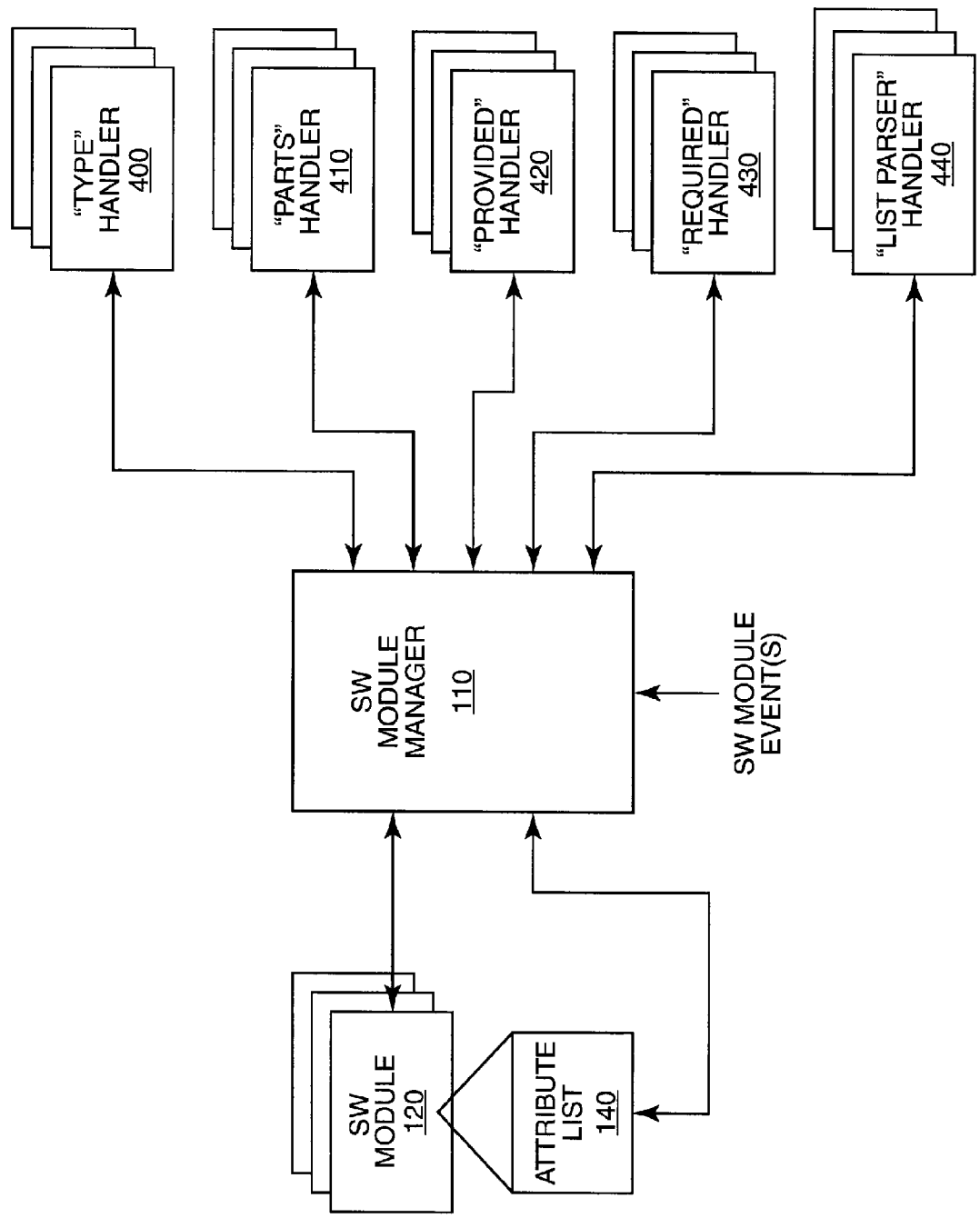
FIG. 4 is a block diagram of an embodiment of a software module manager interfaced between a plurality of mobile device software modules and a plurality of software module handlers.

FIG. 4 illustrates one embodiment of the SW module handlers 130 included in the mobile device 100, computer system 300 or both. According to this embodiment, the SW module manager 110 serves as an interface between the SW modules 120 and one or more instances of a "type" handler 400, "parts" handler 410, "provided" handler 420, "required" handler 430 and "list parser" handler 440. When invoked by the SW module manager 110 in response to a software module event, the "type" handler 400 manages run-time characteristics of the SW module(s) 120 associated with the event. The "type" handler 400 performs any desirable run-time actions such as, but not limited to, activating or deactivating SW modules 120, dynamically linking SW modules 120, resolving interdependencies between the SW modules 120, managing memory, etc.

The "parts" handler 410 manages the deployment of components included in newly installed or preexisting SW modules 120. This can include actions such as, but not limited to, storing SW module components such as code, data, file system resource information, etc. in the proper location in the mobile device 100. The "provided" and "required" handlers 420, 430 together manage software compatibility. This way, software provided by different entities can be universally managed by the SW module manager 110. The "provided" and "required" handlers 420, 430 can perform actions such as, but not limited to, comparing versions of different SW modules 120, comparing a SW module version to the current version of the mobile device software platform, etc. This way, only compatible SW modules 120 are maintained at the mobile device 100. In one embodiment, the attribute lists 140 that specify the actions to be taken by the SW module handlers 130 are included with the corresponding SW modules 120 as an additional component. The SW module manager 110 invokes the "list parser" handler 440 to properly read the attribute lists 140 based on the format of the lists 140. Other kinds of handlers 130 may also be provided for processing the SW modules 120 based on attribute list content.

In one embodiment, the attribute list 140 is a file included in each SW module 120. When a software event occurs, the SW module manager 110 extracts the file from the SW module 120 associated with the event. The SW module manager 110 invokes the "list parser" handler 440 for parsing the file to identify each SW module handler 130 called-out in the file. The parsed file is then passed to each identified SW module handler 130 for processing. In one embodiment, the file includes a section directed to each SW module handler 130 of interest. Each section specifies which actions are to be taken by the corresponding SW module handler 130. Each SW module handler 130 that receives the file parses the file to locate the section directed to that handler 130. The respective SW module handlers 130 then take the action or actions specified in their section of the file. This way, the SW module manager 110 need not be aware of the actions to be taken by the SW module handlers 130 nor the function provided by the SW modules 120. Instead, the SW module manager 110 parses the file and passes it to the SW module handlers 130 identified therein. The identified SW module handlers 130 then perform the specified tasks. According to one embodiment, the file format is based on the extensible markup language (XML).

FIG. 5 illustrates an embodiment of an XML file 500 extracted from one of the SW modules 120. The first line of the XML file 500 identifies the version of the XML file (e.g., 1.0 in FIG. 5) and the type of encoding supported (e.g., UTF-8 in FIG. 5). The "list parser" handler 440 reads the XML file 500 in view of the particular XML format of the file 500 and notifies the SW module manager 110 of the pertinent content. Other SW module handlers 130 to invoke are identified in the XML file 500 using start and end tags. For example, the second line of the XML file 500 includes an attribute type labeled "dpu" that identifies the "type" handler 400. The third line includes a <parts> start tag that identifies the "parts" handler 410. The fourth line identifies the "parts" handler 410 called "load_module". The SW module manager 110 is notified of the "parts" handler reference and passes the XML file 500 to the load_module "parts" handler 410 for processing. Upon receipt, the load_module "parts" handler 410 takes the action specified in the fourth line of the XML file 500. In this exemplary embodiment, the load_module "parts" handler 410 deploys the specified ELF file. The "parts" handler 410 named "resource" is also identified in the XML file 500. The SW module manager 110 is notified of this reference and passes the XML file 500 to the resource "parts" handler 410 for processing. The resource "parts" handler 410 takes the actions specified in the fifth and sixth lines. The seventh line of the XML file 500 includes a </parts> end tag, indicating the end of the "parts" handler section.

The XML file 500 also has a section allocated to the "provided" handler 420 as indicated by the <provides> start tag. The SW module manager 110 is notified of this reference and passes the file 500 to the "provided" handler 420 for processing. The "provided" handler 420 processes the portion of the XML file 500 between the <provides> start tag and </provides> end tag. Particularly, the ninth line specifies the version (2.0), vendor (EMP) and name (SampleSuite) of the SW module 120 from which the XML 500 was obtained. The "provided" handler 420 uses these parameters to determine whether the SW module 120 is compatible with other ones of the SW modules 120. In one embodiment, the "provided" handler 420 extracts the current version (2.0) of the corresponding SW module 120 from the file 500. The "provided" handler 420 then compares the current version of the SW module 120 to the current version of one or more different ones of the SW modules 120. Regardless, the tenth through thirteenth lines of the XML file 500 reference the "provided" handler 420 named "application" which takes the actions specified in these lines. The fourteenth and fifteenth lines of the XML file 500 include end tags signaling the end of the "provided" handler section.

The XML file 500 has yet another section which is allocated to the "required" handler 430 as indicated by the <requires> start tag. This section of the file 500 references the "required" handler 430 named "required_components" at line seventeen. Lines 18-20 relegate three tasks to the "required" handler 430 named "cid". The last three lines of the XML file 500 include end tags indicating the end of the "required" handler and SW module manager sections, respectively. Of course, other SW module handler sections and tasks are contemplated by the various embodiments disclosed herein. As such, the XML embodiment shown in FIG. 5 should be considered exemplary and non-limiting. Other file extensions, implementations or approaches may be used for indicating which ones of the SW module handlers 130 are to be invoked and which tasks are to be performed in response to a software module event.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of managing mobile device software, comprising:
    providing an interface between a plurality of software module handlers and a plurality of heterogeneous software modules; and
    responsive to a software module event corresponding to installation, removal, activation, or modification of one or more of the software modules:
        invoking the interface;
        using the interface to identify the software module and a corresponding attribute list associated with the software module event, wherein the attribute list specifies one or more actions to be taken by at least one of the software module handlers that enable the identified software module to provide one or more functions when invoked;
        distributing the attribute list from the interface to each software module handler identified in the attribute list; and
        taking each action specified in the attribute list by the corresponding software module handler to ensure interoperability of the software modules, wherein taking each action specified in the attribute list comprises implementing one or more run-time characteristics of the software module associated with the software module event to determine whether the software module associated with the software module event is compatible with one or more different ones of the software modules.

2. The method of claim 1, wherein providing an interface between a plurality of software module handlers and a plurality of software modules comprises:
    providing a first interface between a first plurality of software module handlers and a first plurality of software modules associated with a first software platform; and providing a second interface between a second plurality of software module handlers and a second plurality of software modules associated with a second software platform.

3. The method of claim 2, wherein one or more of the first and second plurality of software module handlers are common.

4. The method of claim 1, wherein the software module event is a firmware over the air upgrade event, a software application management event or a software module management event.

5. The method of claim 1, wherein using the interface to identify the software module and a corresponding attribute list associated with the software module event comprises:
 extracting a file from the software module associated with the software module event; and
 invoking the software module handler configured to parse the file to identify each software module handler specified in the file.

6. The method of claim 5, wherein extracting the file comprises extracting an extensible markup language file.

7. The method of claim 5, wherein distributing the attribute list from the interface to each software module handler identified in the attribute list comprises passing the file from the interface to each software module handler identified in the file.

8. The method of claim 1, wherein determining whether the software module associated with the software module event is compatible with the one or more different ones of the software modules further comprises:
 extracting a current version of the software module from the corresponding attribute list; and
 comparing the current version of the software module to a current version of the one or more different ones of the software modules.

9. The method of claim 1, wherein taking each action specified in the attribute list by the corresponding software module handler to ensure interoperability of the software modules further comprises deploying one or more different components of the software module associated with the software module event.

10. A mobile device, comprising:
 a memory configured to store:
  a plurality of heterogeneous software modules, each having a attribute list specifying one or more actions to be taken to enable the corresponding software module to provide one or more functions when invoked; and
  a plurality of software module handlers operable to take different ones of the actions specified by the attribute lists; and
 a controller, responsive to a software module event corresponding to installation, removal, activation or modification of one or more of the software modules, configured to:
  invoke an interface disposed between the software module handlers and the software modules;
  identify the software module and the corresponding attribute list associated with the software module event;
  distribute the attribute list from the interface to each software module handler identified in the attribute list so that each action specified in the attribute list can be taken by the corresponding software module handler to ensure interoperability of the software modules; and
  wherein one or more of the software module handlers are configured to implement one or more run-time characteristics of the software module associated with the software module event to determine whether the software module associated with the software module event is compatible with one or more different ones of the software modules.

11. The mobile device of claim 10, wherein the interface comprises:
 a first interface disposed between a first plurality of software module handlers and a first plurality of software modules associated with a first software platform; and
 a second interface disposed between a second plurality of software module handlers and a second plurality of software modules associated with a second software platform.

12. The mobile device of claim 11, wherein one or more of the first and second plurality of software module handlers are common.

13. The mobile device of claim 10, wherein the interface is operable to extract a file from the software module associated with the software module event and invoke the software module handler configured to parse the file to identify each software module handler specified in the file.

14. The mobile device of claim 13, wherein the interface is operable to extract an extensible markup language file from the software module associated with the software module event.

15. The mobile device of claim 13, wherein the interface is operable to pass the file to each software module handler identified in the file.

16. The mobile device of claim 10, wherein one or more of the software module handlers are operable to extract a current version of the software module from the corresponding attribute list and compare the current version of the software module to a current version of the one or more different ones of the software modules.

17. The mobile device of claim 10, wherein one or more of the software module handlers are operable to deploy one or more different components of the software module associated with the software module event.

18. A computer system, comprising:
 a memory configured to store:
  a plurality of software module handlers operable to take one or more actions that enable different ones of a plurality of heterogeneous mobile device software modules to provide one or more functions when invoked; and
  a software module manager; and
 a controller configured to invoke the software module manager to:
  provide an interface between the software module handlers and the mobile device software modules;
  recognize a software module event corresponding to installation, removal, activation or modification of one or more of the software modules, and in response to recognizing the software module event:
   identify the mobile device software module and a corresponding attribute list associated with the software module event, wherein the attribute list specifies one or more actions to be taken by at least one of the software module handlers; and
   distribute the attribute list from the interface to each software module handler identified in the attribute list so that each action specified in the attribute list can be taken by the corresponding software module handler to ensure interoperability of the software modules; and wherein one or more of the software module handlers are operable to identify one or more run-time characteristics of the mobile device software module associated with the software module event to determine whether the mobile device software module associated with the software module event is compatible with one or more different ones of the software modules.

19. The computer system of claim 18, wherein one or more of the software module handlers are operable to identify one or more different components of the mobile device software module associated with the software module event to be deployed when invoked.

* * * * *